(12) United States Patent
Zaremba et al.

(10) Patent No.: US 9,458,926 B2
(45) Date of Patent: Oct. 4, 2016

(54) AUTOMATIC TRANSMISSION CONTROL

(71) Applicant: Nissan North America, Inc., Franklin, TN (US)

(72) Inventors: Matthew Zaremba, Northville, MI (US); Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 86 days.

(21) Appl. No.: 14/207,849

(22) Filed: Mar. 13, 2014

(65) Prior Publication Data
US 2015/0260277 A1    Sep. 17, 2015

(51) Int. Cl.
| | |
|---|---|
| *F16H 61/14* | (2006.01) |
| *F16H 59/40* | (2006.01) |
| *F16H 59/72* | (2006.01) |
| *B60W 20/00* | (2016.01) |
| *B60W 10/02* | (2006.01) |
| *F16H 59/50* | (2006.01) |
| *F16H 61/16* | (2006.01) |
| *F16H 59/44* | (2006.01) |

(52) U.S. Cl.
CPC .............. *F16H 59/50* (2013.01); *B60W 10/02* (2013.01); *B60W 20/40* (2013.01); *F16H 59/44* (2013.01); *F16H 59/72* (2013.01); *F16H 61/16* (2013.01)

(58) Field of Classification Search
CPC .............. B60W 10/023; B60W 20/40; B60W 10/026; B60W 2510/0233; B60W 2710/024; B60W 20/50; F16H 61/14; F16H 59/50; F16H 2059/446; F16D 2500/50669
See application file for complete search history.

(56) References Cited

U.S. PATENT DOCUMENTS

| | | | | |
|---|---|---|---|---|
| 4,705,134 | A * | 11/1987 | Kitade | B60K 23/0808 180/233 |
| 5,801,499 | A * | 9/1998 | Tsuzuki | B60K 6/365 180/65.25 |
| 6,754,572 | B2 * | 6/2004 | Kawamoto | F16H 61/0437 701/51 |
| 7,516,827 | B2 | 4/2009 | Pickelman, Jr. et al. | |
| 8,355,848 | B2 | 1/2013 | Akebono et al. | |
| 8,589,039 | B2 | 11/2013 | Nakamura et al. | |
| 8,712,673 | B2 * | 4/2014 | Gwon | F02N 11/0818 123/179.4 |
| 2004/0214679 | A1 | 10/2004 | Younger | |
| 2012/0090947 | A1 | 4/2012 | Lee et al. | |
| 2013/0297124 | A1 | 11/2013 | Be et al. | |
| 2013/0345943 | A1 | 12/2013 | Long et al. | |
| 2014/0336893 | A1 * | 11/2014 | Ideshio | B60K 6/445 701/70 |

* cited by examiner

*Primary Examiner* — Jacob S Scott
*Assistant Examiner* — Tinh Dang
(74) *Attorney, Agent, or Firm* — Global IP Counselors, LLP (57) ABSTRACT

An automatic transmission control arrangement includes an automatic transmission coupled to a propulsion device. A selector device is operably connected to the automatic transmission for selecting a mode of operation of the automatic transmission including at least a forward drive setting. A temperature sensor arrangement measures a control temperature of at least one of a cooling system of the propulsion device and the automatic transmission. A motion sensor arrangement detects a motion status of the vehicle. The controller temporarily operates the automatic transmission in a decoupled mode in which the automatic transmission is at least partially decoupled from the propulsion device with the selector device in the forward drive setting in order to reduce heat generation in response to the temperature sensor arrangement detecting the control temperature is greater than a predetermined temperature and the motion sensor indicating that the vehicle is not in motion.

15 Claims, 9 Drawing Sheets

AUTOMATIC TRANSMISSION CONTROL

BACKGROUND

1. Field of the Invention

The present invention generally relates to an automatic transmission control arrangement. More specifically, the present invention relates to control of an automatic transmission in a temporary disabled mode while in Drive in order to reduce heat generation.

2. Background Information

An automatic transmission of a vehicle typically includes a torque convertor that transmits rotary power from an engine of the vehicle to the automatic transmission. The torque convertor is a fluid coupling device that basically includes a pump section, a fixed stator and a turbine section. The pump section of the torque convertor is directly connected to the output shaft of the vehicle engine and rotates therewith. The turbine section of the torque convertor is directly connected to an input shaft of the automatic transmission. The fluid pressure generated by the pump section causes the turbine section of the torque convertor to rotate. At high engine RPMs (revolutions per minute), the fluid pressure generated by the pump section forces the turbine section to rotate. At low engine RPMs, the pump section generates a lower level of fluid pressure, such that the turbine section can stop rotating, such as when the vehicle is at a complete stop and is in "Drive".

When the automatic transmission is in "Drive" and the vehicle is at a complete stop, the torque convertor generates a certain amount of heat due primarily to the fluid shearing friction generated by the pump section and received by the non-rotating turbine section (the turbine section cannot rotate with the automatic transmission in "Drive" and with the vehicle at a complete stop). Hence, when a vehicle is at a complete stop (with no motion) and the transmission is set in the "Drive" mode of operation, the automatic transmission generates heat. Typically, a vehicle is at a complete stop while in "Drive" for only a brief period of time (for instance, at a stop light). Therefore, heat generated by the automatic transmission is usually dissipated once the vehicle is in motion again. However, when the vehicle is at a complete stop and in "Drive" for an extended period of time, the dissipation of the heat generated by the automatic transmission can be a burden on the cooling system of the vehicle, in particular on an extremely hot day.

SUMMARY

One object of the disclosure is to provide an automatic transmission with a disabled mode that is used with the vehicle at a complete stop and with the automatic transmission in "Drive" in order to reduce the amount of heat generated by the automatic transmission.

In view of the state of the known technology, one aspect of the disclosure is an automatic transmission control arrangement that includes a propulsion device, an automatic transmission, a selector device, a temperature sensor arrangement, a motion sensor arrangement and a controller. The propulsion device provides power to a vehicle and has a cooling system. The automatic transmission is coupled to the propulsion device to receive power therefrom and has a hydraulically powered shift control section. The selector device is operably connected to the automatic transmission for selecting a mode of operation of the automatic transmission including at least a forward drive setting. The temperature sensor arrangement measures a control temperature of at least one of the cooling system and the automatic transmission. The motion sensor arrangement detects a motion status of the vehicle. The controller is operably coupled to the motion sensor arrangement, the temperature sensor arrangement and the automatic transmission. The controller temporarily operates the automatic transmission in a decoupled mode in which the automatic transmission is at least partially decoupled from the propulsion device with the selector device in the forward drive setting in order to reduce heat generation in response to the temperature sensor arrangement detecting the control temperature is greater than a predetermined temperature and the motion sensor indicating that the vehicle is not in motion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
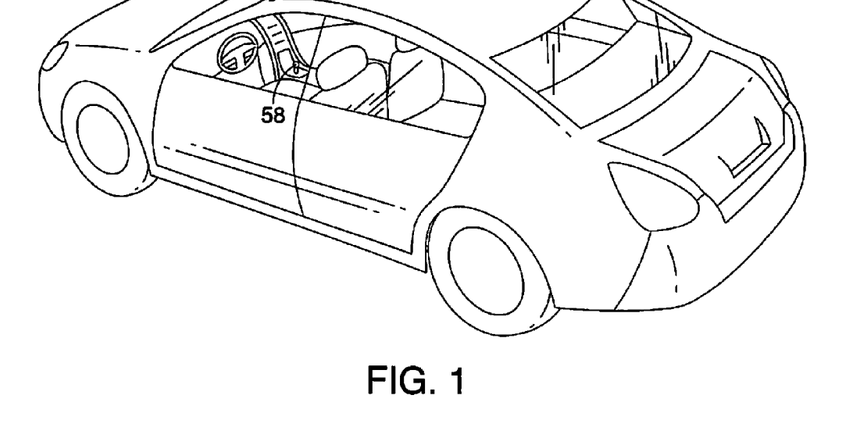
FIG. 1 is a perspective view of a vehicle that includes an automatic transmission control management system in accordance with a first embodiment.
Figure 2:
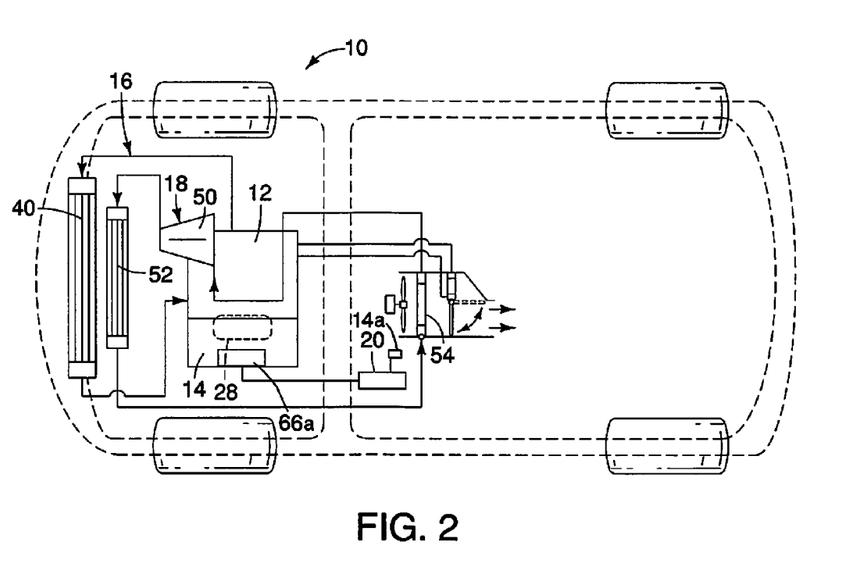
FIG. 2 is a schematic view of the vehicle showing a propulsion device, an automatic transmission with a torque convertor, a cooling system, an air conditioning system and a controller that operates the automatic transmission control management system in accordance with the first embodiment.

Referring initially to FIG. 1, a vehicle 10 is illustrated in accordance with a first embodiment. As shown in FIG. 2, the vehicle 10 includes a propulsion device 12, a transmission 14, a cooling system 16, an air conditioning system 18 and a controller 20. The controller 20 is configured to decouple the transmission 14 from the propulsion device 12 with the vehicle 10 operating in drive (a forward motion setting) while not in motion for a predetermined period of time, in order to reduce the amount of heat generated by the transmission 14, as is explained in greater detail below.

The propulsion device 12 can be any of a variety of devices, such as an internal combustion engine, an electric motor or a hybrid motor assembly (electric and gas powered). The propulsion device 12 includes, among other things, a throttle position sensor or TPS 22 and an RPM sensor 24 (revolutions per minute sensor) that are connected to the controller 20 (see FIG. 3). If the propulsion device 12 is an internal combustion engine or a hybrid motor assembly, then the throttle position sensor 22 can be located at the throttle body of the internal combustion engine or can be connected to the acceleration pedal of the vehicle 10 and the RPM sensor 24 can be connected to an electronic ignition system of the internal combustion engine. If the propulsion device 12 is an electric motor, then the throttle position sensor 22 can be connected to the acceleration pedal of the vehicle 10 and the RPM sensor 24 can detect the speed of the electric motor.

Figure 3:
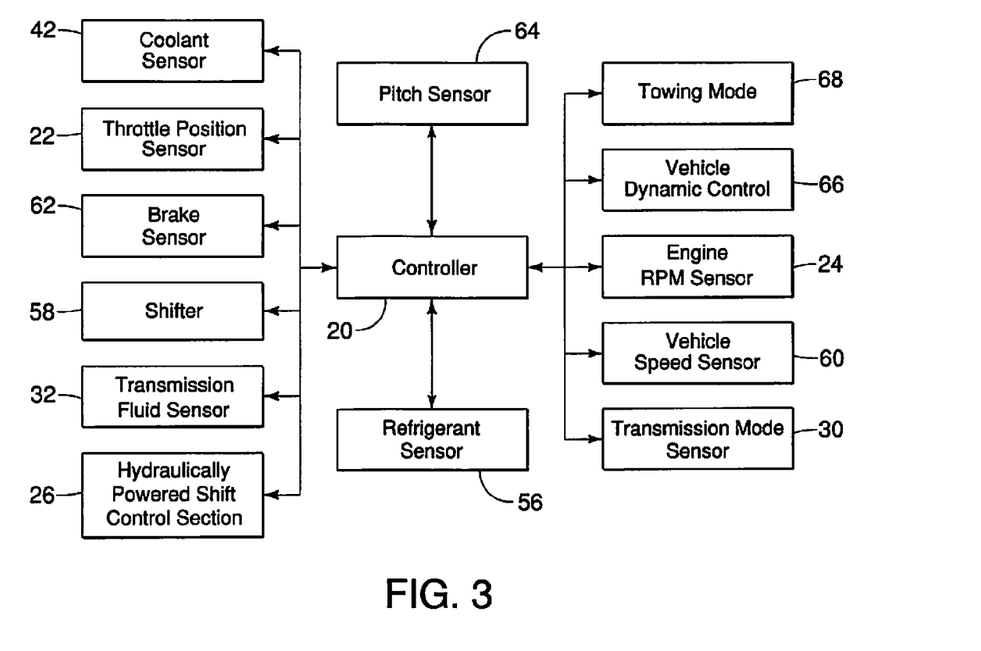
FIG. 3 is a block diagram showing various elements of the automatic transmission control management system connected to the controller in accordance with the first embodiment.

The transmission 14 is an automatic transmission coupled to the propulsion device 12 to receive power therefrom and having a hydraulically powered shift control section 26 (FIG. 3). The transmission 14 can be any of a variety of self-shifting transmissions, such as a multi-gear ratio transmission or a continuously variable transmission (also known as a CVT). The transmission 14 also includes a torque convertor 28 and is operable in a plurality of power transmitting settings, such as drive (a forward motion setting), low (another forward motion setting), reverse, neutral and park. Since the power transmitting settings drive, low, reverse, neutral and park are conventional modes of operation or transmission settings, further description is omitted for the sake of brevity.

The hydraulically powered shift control section 26 operates a plurality of internal gearing mechanisms of the transmission 14 that are activated by a clutch or clutches that engage and disengage the various gearing mechanisms. The clutches within the transmission 14 are operated by the hydraulically powered shift control section 26 within the transmission 14. The hydraulically powered shift control section 26 can also control a lockup clutch within the torque convertor 28, if a lockup clutch is included. Further, the hydraulically powered shift control section 26 can perform various operations within the transmission 14 related to the flow of fluid in and out of the torque convertor 28.

The torque convertor 28 is basically a fluid coupling mechanism that includes at least an outer casing with an impeller, a stator and a turbine. The impeller is typically rigidly fixed to an inner surface of the outer casing. The stator and turbine are disposed within the outer casing. The stator typically includes a one-way clutch such that the stator can only rotate in one direction within the outer casing, while the turbine is freely rotatable within the outer casing. The outer casing (and the impeller) is usually directly attached to a flywheel or an output shaft of the propulsion device 12 and rotates therewith. The turbine of the torque convertor 28 is typically attached to an input shaft of the transmission. Transmission fluid within the torque convertor 28 is pumped by the impeller such that the transmission fluid passes along surfaces of the stator and into the turbine, causing the turbine to rotate. When the turbine rotates, the input shaft of the transmission 14 rotates with it, and with the transmission 14 set in drive, the vehicle 10 moves forward. When the transmission is in drive, and the vehicle 10 is not moving, the impeller of torque convertor 28 rotates, but the turbine does not rotate, causing production of heat.

The transmission 14 can also be connected to or can include a transfer mechanism 14a in FIG. 2, that switches output from the transmission 14 between a two-wheel drive operation and a four-wheel drive operation. The transfer mechanism 14a includes a mode sensor 30 (FIG. 3) that detects whether or not the transfer mechanism 14a is set to two-wheel drive operation or four-wheel drive operation.

Further, the transmission 14 includes a temperature sensor 32 that measures the temperature of transmission fluid within the transmission 14 that flows through the transmission 14, through the torque convertor 28 and the hydraulically powered shift control section 26.

The cooling system 16 typically includes a radiator 40 that dissipates heat and a temperature sensor 42 that measures the temperature of coolant flowing through the radiator 40. The coolant of the cooling system 16 flows through the radiator 40 and the propulsion device 12 in order to dissipate heat from the propulsion device 12. The radiator 40 can also include transmission lines (not shown) that receive and cool the transmission fluid of the transmission 14. In other words, heat generated by the transmission 14 and the torque convertor 28 is carried by the transmission fluid from the transmission 14 to the radiator 40 where heat is dissipated in a conventional manner The air conditioning system 18 is a conventional system that includes a compressor 50, a condenser 52, an evaporator 54 and a refrigerant sensor 56 (FIG. 3). Since the compressor 50, the condenser 52 and the evaporator 54 are conventional components of an air conditioning system, further description is omitted for the sake of brevity. The refrigerant sensor 56 is provided as a part of the air conditioning system 18 to measure either the temperature or the pressure of the refrigerant within, for example, the condenser 52. In the depicted embodiment, the refrigerant sensor 56 is configured to measure the refrigerant pressure at the condenser 52.

The vehicle 10 further includes a shifter 58 that sets operation of the transmission 14 (drive, low, reverse, neutral or park), a speed sensor 60 that detects the speed of the vehicle 10 and a brake sensor 62 that detects braking fluid pressure of a braking system of the vehicle 10, thereby detecting whether or not the brakes are being applied by the vehicle operator.

The vehicle 10 can also optionally include the following: a pitch sensor 64, a vehicle dynamic control 66 (VDC 66) and a towing mode switch 68. The pitch sensor 64 is located on or within the vehicle 10 and detects whether or not the vehicle 10 is on level ground, is on an inclined surface facing uphill or on an inclined surface facing downhill.

The vehicle dynamic control 66 (VDC 66) is a stabilizing control system linked to vehicle throttle control (of the propulsion device 12), the braking system and steering mechanism of the vehicle 10 that selectively applies brakes to one or more wheels of the vehicle and/or reduces throttle of the propulsion device 12 in certain predetermined adverse driving conditions to stabilize wheel traction of the vehicle 10. The VDC 66 can be manually disabled in response to a special driving circumstance via a switching device 66a that is connected to the controller 20, as shown schematically in FIG. 2. Since the VDC 66 is a conventional feature, further description is omitted for the sake of brevity.

The towing mode switch 68 is coupled to the transmission 14 and sets operation of the transmission 14 between a towing mode of operation and a normal mode of operation. In the towing mode of operation, the hydraulically powered shift control section 26 changes the shifting pattern of the transmission 14 in order to more effectively tow, for example, a trailer. As shown in FIG. 3, the controller 20 is electronically connected to the throttle position sensor 22, the RPM sensor 24, the hydraulically powered shift control section 26, the mode sensor 30, the temperature sensor 32 (transmission fluid), the temperature sensor 42 of the cooling system 16, the refrigerant sensor 56 (refrigerant pressure), the shifter 58, the speed sensor 60, the brake sensor 62, the pitch sensor 64, the VDC 66, and the towing mode switch 68.

The controller 20 uses the information provided by each of the elements shown in FIG. 3 in determining whether or not to decouple the transmission 14 from the propulsion device 12 in order to reduce generation of heat by the transmission 14, in a manner described further below with specific reference to FIGS. 4-14.

Figure 4:
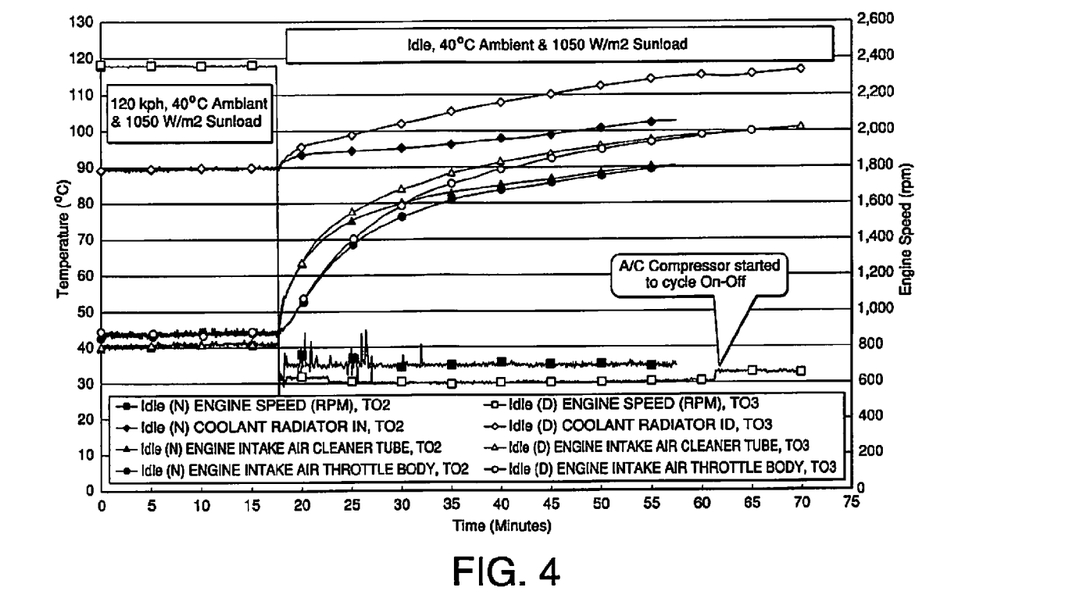
FIG. 4 is a chart showing temperature levels measured in various systems of a vehicle over time, with the transmission of the vehicle in neutral (N) and with the transmission of the vehicle in drive (D) showing increased levels of heat generation with the transmission of the vehicle in drive (D) as compared to heat generated with the transmission of the vehicle in neutral (N)

FIG. 4 represents an engine cooling performance study of the engine of a conventional vehicle. The temperature of various components of the engine of the conventional vehicle were recorded, such as engine speed (RPM), temperature of coolant in the radiator, temperature of the air entering the intake of the air cleaner of the engine, and temperature of air entering the throttle body of the engine.

FIG. 4 is a graph include various sets of the collected data based on operation of the conventional vehicle, basically showing a comparison of temperatures (lines with filled in circles, diamonds and triangles) with the transmission 14 in neutral (N) and temperatures (lines with hollow circles, diamonds and triangles) measured with the transmission 14 set in drive (D). The engine RPM (revolutions per minute) are also shown over the same period of time with the transmission 14 in neutral (N) in a line having solid squares and drive (D) in a line having hollow squares.

As shown in FIG. 4, the first 18 minutes of the time period depicted, the conventional vehicle is thoroughly warmed up and is operated in conditions simulating motion of a conventional vehicle at 130 kph, in warm ambient conditions at 40 degrees C., with the sun shining on the vehicle 10. After the initial 18 minutes, the data collected in two separate tests are shown, one test with the conventional vehicle in neutral (N) and one test with the conventional vehicle in drive (D). After the initial 18 minutes, the conventional vehicle is not in motion. The data collected with the transmission 14 in drive (D) was collected with brakes of the conventional vehicle being applied (the conventional vehicle is not in motion—no speed and at a complete stop). The data collected with the transmission 14 in neutral (N) was also collected with brakes of the conventional vehicle being applied, again the conventional vehicle is not in motion—no speed and at a complete stop.

The data presented in FIG. 4 clearly shows that at a complete stop beginning at the 18 minute mark, the temperature of coolant in the radiator with the transmission of the engine in neutral (N) increases only slightly. Specifically, at the 18 minute mark, the temperature of the coolant is about 90 degrees C. At the 55 minute mark, the engine temperature is approximately 102 degrees C. In contrast, the temperature of coolant in the radiator with the transmission of the engine in drive (D) increases to a much higher temperature. Specifically, at the 18 minute mark, the temperature of the coolant is about 90 degrees C. However, at the 55 minute mark, the engine temperature is approximately 114 degrees C. Further, since temperature within an engine compartment of the conventional vehicle is also rising, temperature of the air being drawn into the engine also increases.

The data in FIG. 4 clearly shows that a significant amount of heat is generated with the transmission in drive (D) that is not being immediately dissipated by the radiator of the conventional vehicle. It should be understood that the transmission includes hydraulic lines that flow to and from the radiator of the conventional vehicle (and also in the vehicle 10 described herein). Some of the heat reflected by the increased coolant temperature is also produced by the engine itself. However, a portion of the extra heat generated with the transmission in drive (D), as shown in FIG. 4, is generated by the torque convertor of the transmission. Specifically, the torque convertor generates fluid friction when the vehicle is at a stop with the transmission in drive (D). With the conventional vehicle at a stop and its transmission in drive (D) for an extended period of time, the cooling system of the conventional vehicle is burdened with the task of dissipating this extra heat.

The automatic transmission control arrangement control described below is for the purpose of operating the transmission 14 such that during prolonged stops, with the transmission 14 in drive (D), the controller 20 decouples the transmission 14 from the propulsion device 12 to state similar to being in neutral (N), in order to reduce the heat otherwise generated by the torque convertor with the transmission in drive (D).

Figure 5:
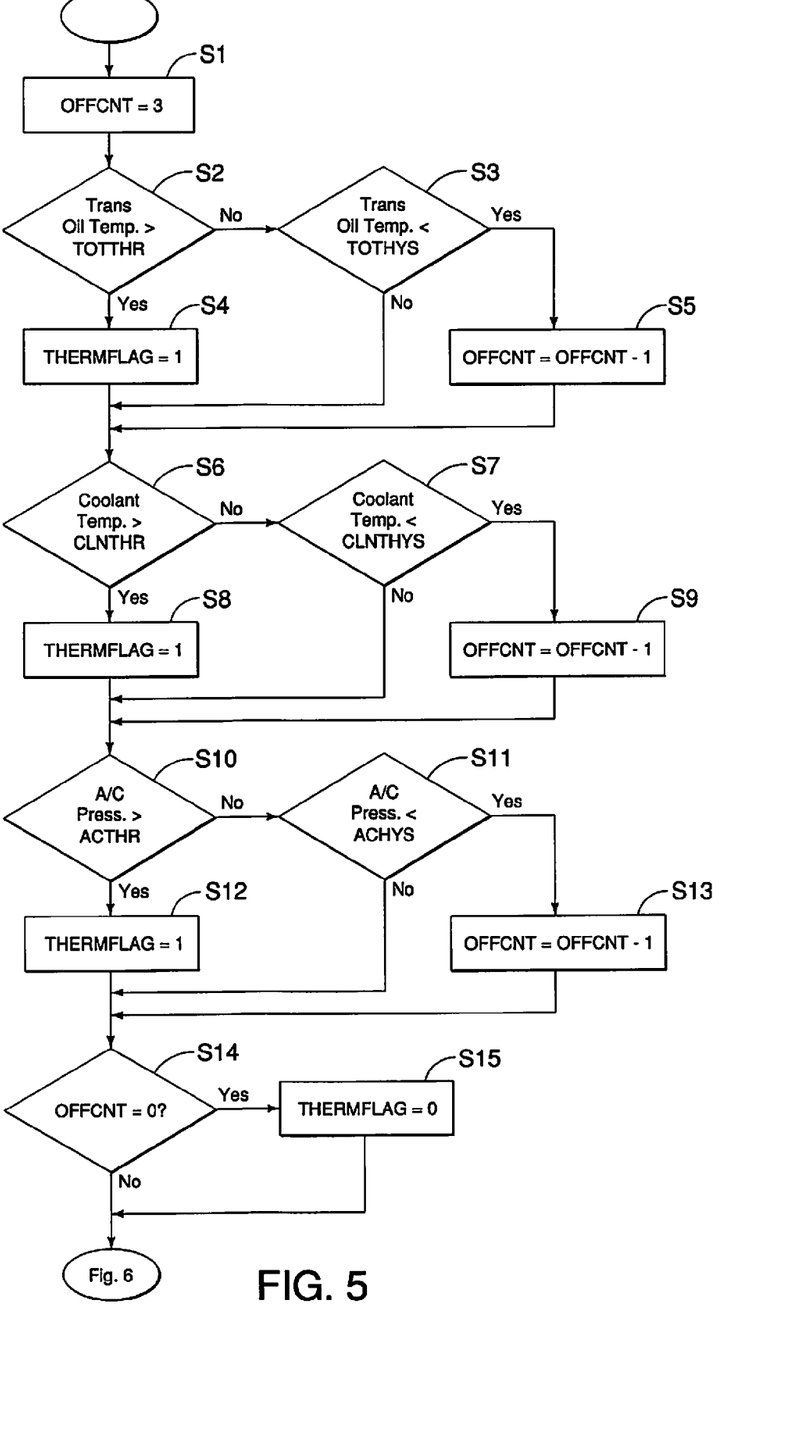
FIG. 5 is a flowchart showing various operations performed by the controller of the automatic transmission control management system in accordance with the first embodiment.
Figure 6:
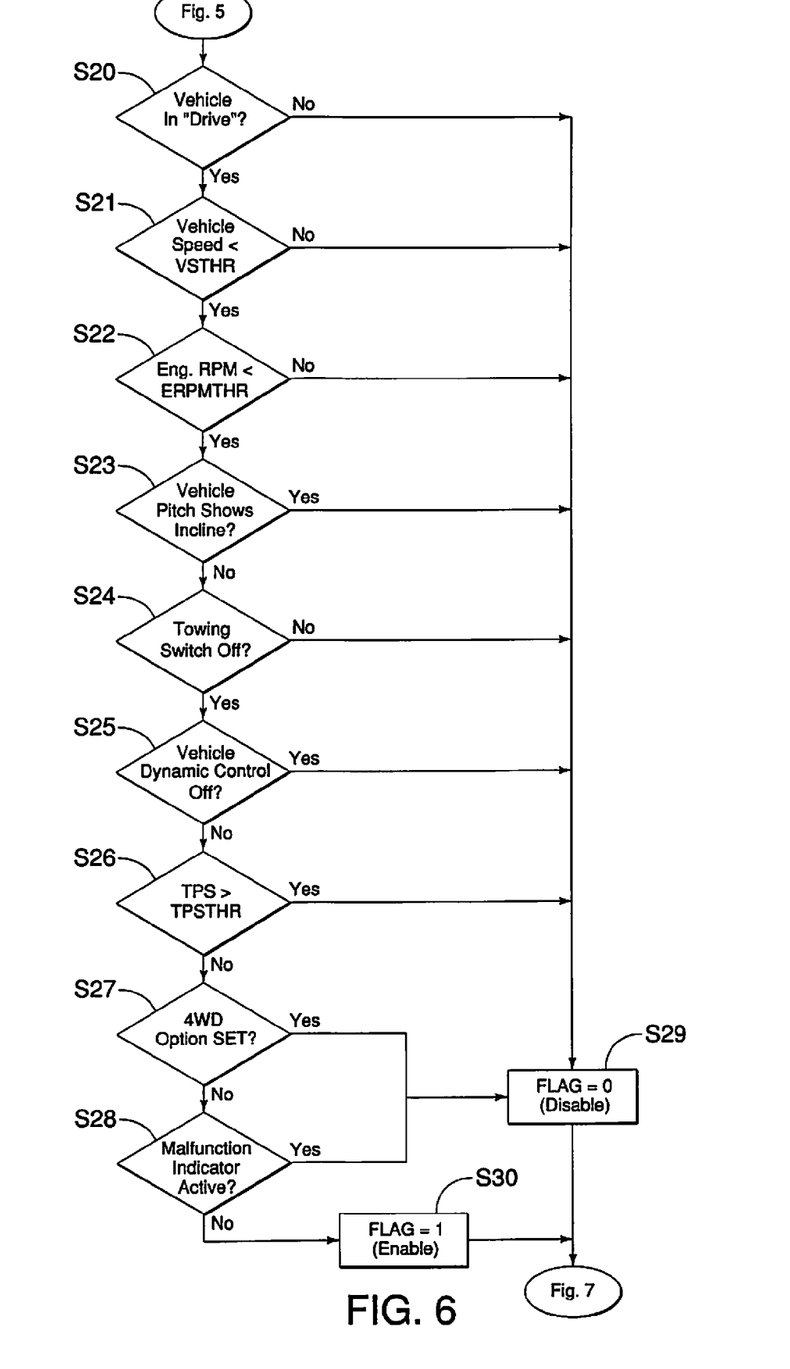
FIG. 6 is another flowchart showing various operations performed by the controller of the automatic transmission control management system in accordance with the first embodiment.
Figure 7:
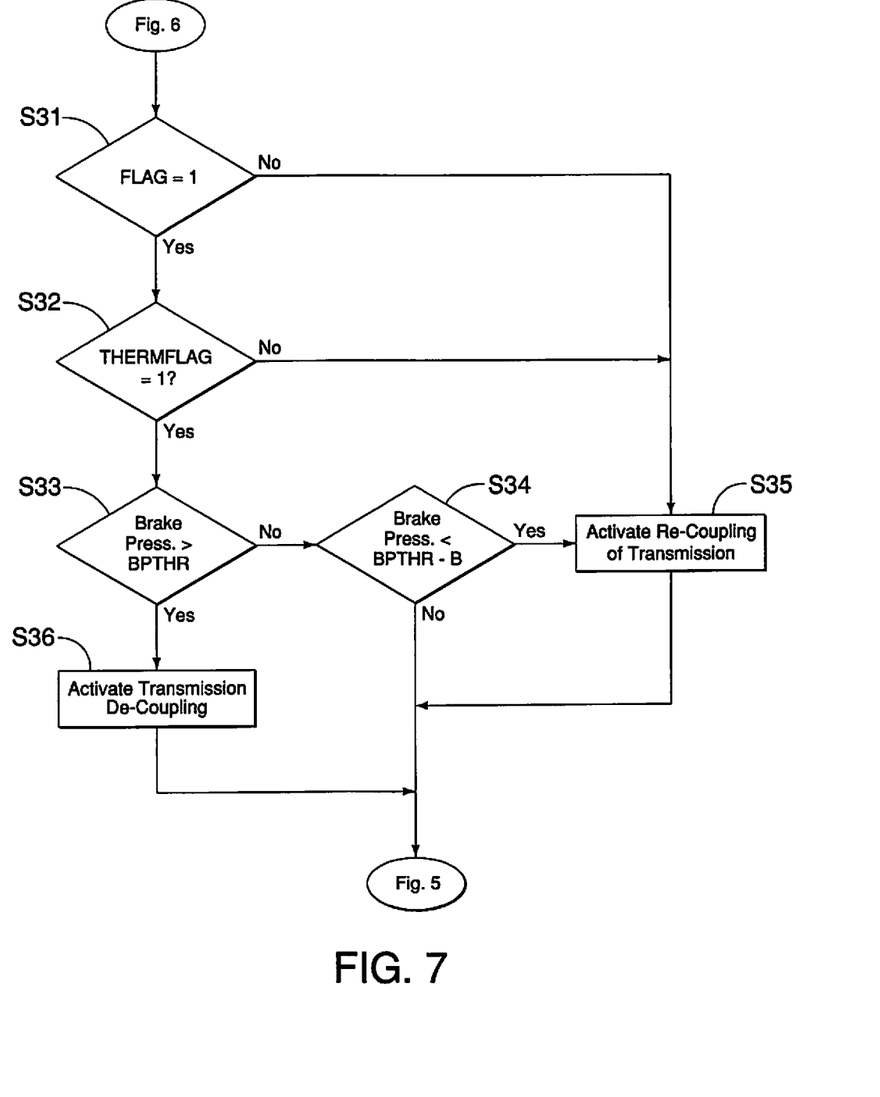
FIG. 7 is yet another flowchart showing various operations performed by the controller of the automatic transmission control management system in accordance with the first embodiment.

A first set of logic is used by the controller 20 to determine a thermal need for a decoupling action, as set forth in the flowchart in FIG. 5. Initially, a series of variables are defined for use in the logic of FIG. 5. Many of the variables listed below are thresholds that can be fine-tuned and/or adjusted in accordance in order to achieve differing benefits, such as increased fuel economy, adjust emissions and improve component durability. In consideration of these benefits, the transmission control described hereinbelow can be implemented all the time or during select conditions in an effort to achieve the above mentioned benefits. The variable and thresholds include at least the following:

OFFCNT is a counter initially set to a value of three (3) and is used in determining whether or not to decouple the transmission 14 from the propulsion device 12;

TOTTHR represents a predetermined upper transmission oil temperature threshold such that if the temperature sensor 32 detects that the transmission oil (aka transmission fluid) is above the value of the variable TOTTHR, then the controller 20 is provided with an indication that a large amount of heat has been produced by the transmission and thermal mitigation may be necessary with the transmission 14 being decoupled from the propulsion device 12 depending upon further factors considered in the logic in FIGS. 5-7;

TOTHYS represents a predetermined lower transmission oil temperature threshold such that if the temperature sensor 32 detects that the transmission oil (aka transmission fluid) temperature is below the value of the variable TOTHYS, then the transmission 14 is operating in a normal temperature range;

THERMFLAG is a counter that is made equal to one (1) or zero (0), if equal to one (1) then the controller 20 is set to consider decoupling the transmission 14 from the propulsion device 12, and if equal to zero (0) the controller 20 does not consider decoupling the transmission 14 from the propulsion device 12;

CLNTHR represents a predetermined upper coolant temperature threshold such that if the temperature sensor 42 detects that the coolant temperature is above the value of the variable CLNTHR, then the controller 20 is provided with an indication that a large amount of heat has been produced by the transmission and the propulsion device 12, and thermal mitigation may be necessary with the transmission 14 being decoupled from the propulsion device 12 depending upon further factors considered in the logic in FIGS. 5-7;

CLNTHYS represents a predetermined lower coolant temperature threshold such that if the temperature sensor 42 detects that the coolant temperature is below the value of the variable CLNTHYS, then the cooling system 16 is operating in a normal temperature range;

ACTHR represents a predetermined upper refrigerant pressure threshold such that if the refrigerant sensor 56 detects that the refrigerant pressure in the condenser 52 is above the value of the variable ACTHR, then the controller 20 is provided with an indication that a large amount of heat has been produced and thermal mitigation may be necessary with the transmission 14 being decoupled from the propulsion device 12 depending upon further factors considered in the logic in FIGS. 5-7;

ACHYS represents a predetermined lower refrigerant pressure threshold such that if the refrigerant sensor 56 detects that the refrigerant pressure is below the value of the variable ACHYS, then the air conditioning system 18 is operating in a normal pressure range;

VSTHR represents a vehicle speed threshold that is close to zero (0) or equal to zero (0) such that if the vehicle is traveling above the value of the variable VSTHR, then the controller 20 does not consider decoupling the transmission 14 from the propulsion device 12;

ERPMTHR represents an engine RPM threshold that is different for each vehicle, but is equal to an RPM speed of the propulsion device 12 at idle;

TPSTHR represents a throttle position sensor threshold that corresponds to a position of a throttling mechanism at the throttle body of the propulsion device 12 and corresponds to a position where a vehicle operator is not pressing on the accelerator pedal; and BPTHR represents a brake pressure threshold that corresponds to a brake fluid pressure indicating that the brakes are being applied by the vehicle operator such that the vehicle 10 is not likely in motion. The value of BPTHR differs vehicle to vehicle.

The variables TOTTHR and TOTHYS are spaced apart from one another in value such that the variable TOTTHR is greater than the variable TOTHYS. Further, when the temperature of the transmission fluid (oil) is greater than the value TOTTHR, this is an indication that heat needs to be dissipated. When the temperature of the transmission fluid has a value that is between the variable TOTTHR and the variable TOTHYS, there is an indication that some excess heat is present. When the temperature of the transmission fluid is below the value of the variable TOTHYS, then the transmission 14 is operating in a normal temperature range.

The variables CLNTHR and CLNTHYS are spaced apart from one another in value such that the variable CLNTHR is greater than the variable CLNTHYS. Further, when the temperature of the coolant is greater than the value CLNTHR, this is an indication that heat needs to be dissipated. When the temperature of the coolant has a value that is between the variable CLNTHR and the variable CLNTHYS, there is an indication that some excess heat is present. When the temperature of the coolant is below the value of the variable CLNTHYS, then the cooling system 16 is operating in a normal temperature range.

The variables ACTHR and ACHYS are spaced apart from one another in value such that the variable ACTHR is greater than the variable ACHYS. Further, when the pressure of the refrigerant is greater than the value ACTHR, this is an indication that heat needs to be dissipated. When the pressure of the refrigerant has a value that is between the variable ACTHR and the variable ACHYS, there is an indication that some excess heat is present. When the pressure of the refrigerant is below the value of the variable ACHYS, then the air conditioning system 18 is operating in a normal temperature range. It should be understood from the drawings and the description herein that in the event of a sensor or hardware malfunction, the controller 20 can rely on a predetermined value of any one of the above variables in order to achieve the coupling and de-coupling of the transmission 14 from the propulsion device 12. Further, in order to simplify the hardware of the automatic transmission control system described herein, it is possible to eliminate one or more of the sensors and provide the controller 20 with a default value that simulates one or more of the readings provided by the eliminated sensor(s).

At step S1 in FIG. 5, the controller 20 defines the variable OFFCNT making it equal to three (3). However, the variable OFFCNT can be redefined by the controller in subsequent actions as set forth in the flowchart set forth in FIG. 5. At step S2, the controller 20 determines whether or not the temperature of the transmission fluid in the transmission 14, as measured by the temperature sensor 32, is greater than the variable TOTTHR. If the temperature is not above TOTTHR, then operation moves to step S3. If the temperature is above TOTTHR, operation moves to step S4.

At step S3, the controller 20 determines whether or not the temperature of the transmission fluid in the transmission 14, as measured by the temperature sensor 32, is less than the variable TOTHYS. If the temperature is below TOTHYS, then operation moves to step S5. If not, operation moves to step S6. At step S5, the counter OFFCNT is decreased by one (OFFCNT is made equal to the OFFCNT−1).

At step S4, the variable THERMFLAG is made equal to one (1) to consider decoupling the transmission 14 from the propulsion device 12.

At step S6, the controller 20 determines whether or not the temperature of the coolant in the cooling system 16, as measured by the temperature sensor 42, is greater than the variable CLNTHR. If the coolant temperature is not above CLNTHR, then operation moves to step S7. If the coolant temperature is above CLNTHR, operation moves to step S8.

At step S7, the controller 20 determines whether or not the coolant temperature, as measured by the temperature sensor 42, is less than the variable CLNTHYS. If the temperature is below CLNTHYS, then operation moves to step S9. If not, operation moves to step S10. At step S9, the counter OFFCNT is decreased by one (OFFCNT is made equal to the OFFCNT−1). At step S8, the variable THERMFLAG is made equal to one (1).

At step S10, the controller 20 determines whether or not the refrigerant pressure of the refrigerant in in the condenser 52 of the air conditioning system 18, as measured by the refrigerant sensor 56, is greater than the variable ACTHR. If the refrigerant pressure is not above ACTHR, then operation moves to step S11. If the refrigerant pressure is above ACTHR, operation moves to step S12.

At step S11, the controller 20 determines whether or not the refrigerant pressure, as measured by the refrigerant sensor 56, is less than the variable ACHYS. If the refrigerant pressure is below ACHYS, then operation moves to step S13. If not, operation moves to step S14. At step S13, the counter OFFCNT is decreased by one (OFFCNT is made equal to the OFFCNT−1).

At step S14, the controller 20 determines whether or not the variable OFFCNT is equal to zero (0). If the variable OFFCNT is equal to zero (0), then the conditions checked in steps S2 through S13 are such that it is not necessary to decouple the transmission 14 from the propulsion device 12 and operation moves to step S15 where the variable THERMFLAG is made equal to zero (0), then operation moves to the logic set forth in FIG. 6. At step S14, if the variable OFFCNT is not equal to zero (0), operation moves to the logic set forth in FIG. 6.

In FIG. 6 at step S20, the controller 20 determines whether or not the selector or shifter 58 is set to drive (D) such that the transmission 14 is engaged for forward movement. If the shifter 58 is set to drive (D), then operation moves to step S21. If not, operation moves to step S29.

At step S21, the controller 20 determines whether or not the vehicle speed detected by the speed sensor 60 is less than the variable VSTHR (vehicle speed threshold), which is defined as being close to zero (0) or equal to zero (0). For example, the variable VSTHR is preferably less than 0.1 MPH. If the vehicle speed is less than VSTHR, then operation moves to step S22. If not, operation moves to step S29.

At step S22, the controller 20 determines whether or not the engine speed (in revolutions per minute) as detected by the RPM sensor 24 is less than the variable ERPMTHR (engine RPM threshold). If the engine speed is less than ERPMTHR, then operation moves to step S23. If not, operation moves to step S29.

At step S23, the controller 20 determines whether or not the vehicle 10 is on an inclined surface as detected by the pitch sensor 64. If the vehicle is not on an inclined surface, then operation moves to step S24. If so, operation moves to step S29.

At step S24, the controller 20 determines whether or not the towing mode switch is set to OFF. If the towing mode switch is set to OFF, then operation moves to step S25. If the towing mode switch is set to ON, operation moves to step S29.

At step S25, the controller 20 determines whether or not the vehicle dynamic control or VDC 66 is off. If the VDC 66 is set to ON, then operation moves to step S26. If the VDC 66 is OFF, operation moves to step S29.

At step S26, the controller 20 determines whether or not the engine throttle position sensor 22 is currently moved to a value greater than the variable TPSTHR. If the engine throttle position sensor 22 is not moved to a value greater than the variable TPSTHR, then operation moves to step S27. If the engine throttle position sensor 22 is moved to a value greater than the variable TPSTHR, then operation moves to step S29.

At step S27, the controller 20 determines whether or not the mode sensor 30 detects the transmission 14 is set to operate in the four-wheel drive mode. If the mode sensor 30 indicates the transmission is set to operate in two wheel drive mode, then operation moves to step S28. If the mode sensor 30 indicates the transmission is set to operate in four-wheel drive mode, then operation moves to step S29.

At step S28, the controller 20 determines whether or not a there is a malfunction indicator present in one of the systems of the vehicle 10. If there is a malfunction indicator present, the operation moves to step S29. If not, operation moves to step S30.

At step S29, a variable FLAG is made equal to zero (0). At step S30, the variable FLAG is made equal to one (1). Operation then moves to the logic set forth in FIG. 7.

In FIG. 7 at step S31, the controller 20 determines whether or not the variable FLAG is equal to one (1). If FLAG is equal to one (1) it means that none of the conditions detected in the steps in FIG. 6 preclude the possibility of decoupling the transmission 14 from the propulsion device 12. Therefore, if FLAG is equal to one (1), operation moves to step S32. If FLAG is not equal to one (1), but instead is equal to zero (0), then at least one of the conditions detected in FIG. 6 precludes the possibility of decoupling the transmission 14 from the propulsion device 12, and operation moves to step S35.

At step S32, the controller 20 determines whether or not the variable THERMFLAG is equal to one (1). If the variable THERMFLAG is equal to one (1), then operation moves to step S33. If the variable THERMFLAG is not equal to one (1), then operation moves to step S35.

At step S33, the controller 20 determines whether or not the brake pressure of the braking system of the vehicle 10 as measured by the brake sensor 62 is greater than the variable BPTHR. If the brake pressure is greater than the variable BPTHR, then the brakes are being applied with a level of force that ensures a complete stop of the vehicle 10. Therefore, if the brake pressure is greater than the variable BPTHR, then operation moves to step S36. If the brake pressure is not greater than the variable BPTHR, then operation moves to step S34.

At step S34, the controller 20 determines whether or not the brake pressure of the braking system of the vehicle 10 as measured by the brake sensor 62 is less than the variable BPTHR minus a variable B (BPTHR−B), where the variable B is determined on a vehicle by vehicle basis. The expression (BPTHR−B) represents a lower threshold of brake pressure such that the braking pressure measured by the brake sensor 62 may not sufficient to trigger the condition required in step S33, but is not low enough to preclude the possibility of decoupling the transmission 14 from the propulsion device 12. Therefore, if at step S34 if the brake pressure is not less than (BPTHR−B), then operation progresses to a further iteration of the logic returning to FIG. 5, without a decision of whether or not to change the current coupled or decouple state of the transmission 14 relative to the propulsion device 12. However, if at step S34 the brake pressure is less than (BPTHR−B), then operation moves to step S35. Step S34 serves to take "creep" into consideration. "Creep" is a condition where a vehicle is moving at an extremely slow speed with or without the brake being applied. At step S34, if the brake pressure is above (BPTHR−B) then the controller 20 assumes an indication that the vehicle may be about to experience "creep", perhaps intentionally. Therefore, no decision concerning de-coupling of the transmission 14 from the propulsion device 12 is made at this time, and a further iteration of the logic can proceed. If the brake pedal is below (BPTHR−B), then the controller 20 assumes the vehicle operator is allowing the vehicle to "creep" or is about to accelerate.

One of the effects of step S34, is that, if the transmission 14 is currently decoupled from the propulsion device 12 when the logic reaches step S34, and the measured brake pressure is not less than (BPTHR−B), then the transmission 14 remains decoupled from the propulsion device 12.

In step S35, the controller 20 makes the decision not to decouple the transmission 14 from the propulsion device 12. If the transmission 14 is currently decoupled from the propulsion device 12, then at step S35, the controller recouples the transmission 14 to the propulsion device 12, effectively returning the transmission 14 to drive (D). Operation then progresses to a further iteration of the logic returning to FIG. 5.

In step S36, the controller 20 makes the decision to decouple the transmission 14 from the propulsion device 12, effectively putting the transmission 14 in neutral even though the shifter 58 is set to drive (D). This decision serves to reduce heat generation by the torque converter 28 of the transmission 14, as demonstrated by the data in FIG. 4. Thereafter, operation progresses to a further iteration of the logic returning to FIG. 5.

It should be understood, that any of a number of actions determined by the logic in FIG. 6 can immediately cause the logic to return to step S35 not to decouple the transmission 14 from the propulsion device 12, and re-coupling the transmission 14 to the propulsion device 12. For example, if the vehicle operator should press on the accelerator pedal within the vehicle 10, (which requires removing pressure from the braking system) changes in the throttle position sensor 22 and/or the RPM sensor 24 will trigger the controller 20 to re-couple the transmission 14 to the propulsion device 12.

Figure 8:
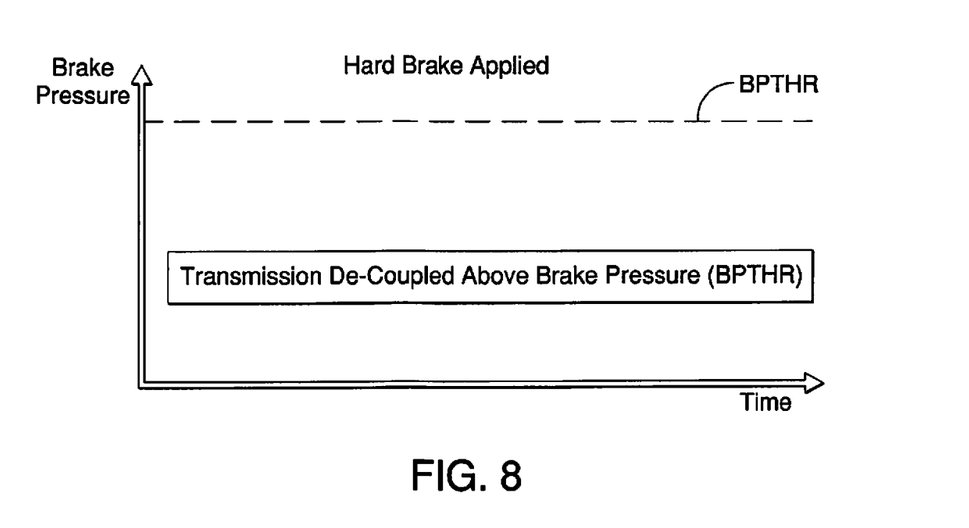
FIG. 8 is a chart showing brake pressure detected by the controller of the vehicle over a period of time showing a brake level pressure threshold above which the controller is activated to decouple the transmission from the propulsion device to reduce heat production in accordance with the first embodiment.
Figure 9:
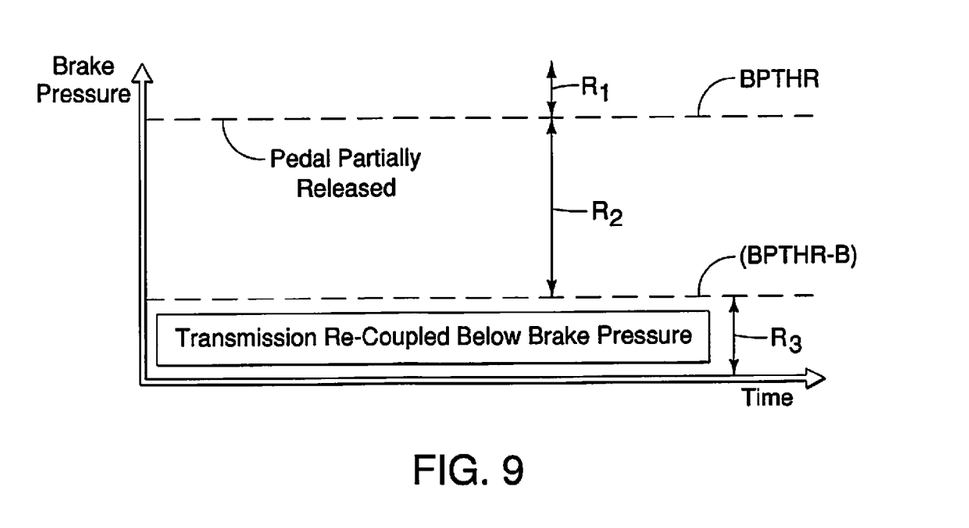
FIG. 9 is another chart showing brake pressure detected by the controller of the vehicle over a period of time showing the brake level pressure threshold and a brake level pressure range below the brake level pressure threshold in which the controller is activated to re-couple the transmission to the propulsion device in accordance with the first embodiment.

FIGS. 8 and 9 depict various conditions that demonstrate the logic set forth in Steps S33-S36. FIG. 8 shows that, in order for the controller 20 to be enabled to decouple the transmission 14 from the propulsion device 12, the brake pressure measured by the brake sensor 62 must be greater than the variable BPTHR. If the brake pressure is not greater than the value of the variable BPTHR, then the transmission 14 remains coupled to the propulsion device 12.

FIG. 9 shows conditions that allow the controller 20 to recouple the transmission 14 to the propulsion device 12 after the controller 20 had decoupled the transmission 14 from the propulsion device 12. Specifically, in FIG. 9, if the brake pressure remains above the variable BPTHR in the range $R_1$, the transmission 14 remains decoupled from the propulsion device 12. If the brake pressure remains above the variable (BPTHR−B) but below the variable BPTHR in the range $R_2$ in FIG. 9, the transmission 14 remains decoupled from the propulsion device 12. However, once the brake pressure has dropped to a level below the value of the variable (BPTHR−B) in the range $R_3$, then the controller recouples the transmission 14 to the propulsion device 12.

It should also be understood from the drawings and the description herein that the logic of the controller 20 can be simplified and still operate as disclosed. For example, the drawings show temperature measurement of both the coolant in the cooling system 16 and the transmission fluid (transmission oil) of the transmission 14. It is also possible to carry out the logic of the controller 20 with only one of the temperature measurements disclosed. Specifically, either the temperature sensor 32 or the temperature sensor 42 can be omitted.

Further, both the RPM sensor 24 and the speed sensor 60 are defined herein as a motion sensor arrangement. Specifically, when the RPM sensor 24 detects an RPM of the propulsion device 12 to be above a predetermined level, such as the variable ERPMTHR, the vehicle 10 can be assumed to be in motion since the transmission 14 is set to operate in drive (D). It is possible to carry out the logic of the controller 20 using only one of the RPM sensor 24 and the speed sensor 60. In other words, either the RPM sensor 24 or the speed sensor 60 can be omitted.

Further the above logic can be modified by including a timer that prevents the controller 20 from decoupling the transmission 14 from the propulsion device 12 for a specific predetermined period of time that begins once the controller 20 determines that the vehicle 10 has come to a complete stop. Such a predetermined time period can be between 20 seconds and 60 seconds to correspond with a typical stoplight time interval.

Second Embodiment

Referring now to FIGS. 10 through 13, logic of the controller 20 is shown in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the logic described above with respect to FIGS. 5 and 6 remains unchanged. However, in the second embodiment, the logic in the flowchart of FIG. 7 is replaced by the logic set forth in the flowchart of FIG. 10.

Further, the hydraulically powered shift control section 26 of the transmission 14 is configured such that the level of coupling of the transmission 14 to the propulsion device 12 can be changed in accordance with changes in internal fluid pressure within the transmission 14. For example, the hydraulic fluid within the torque convertor 28 can be redirected by manipulations of, for instance, the stator of the torque convertor 28 or by valve arrangements within the hydraulically powered shift control section 26. The hydraulic pressure provided to clutches within the transmission 14 can also be manipulated by the control of the hydraulically powered shift control section 26 to partially engage and dis-engage the clutches (whether they be disk or band clutches).

Figure 10:
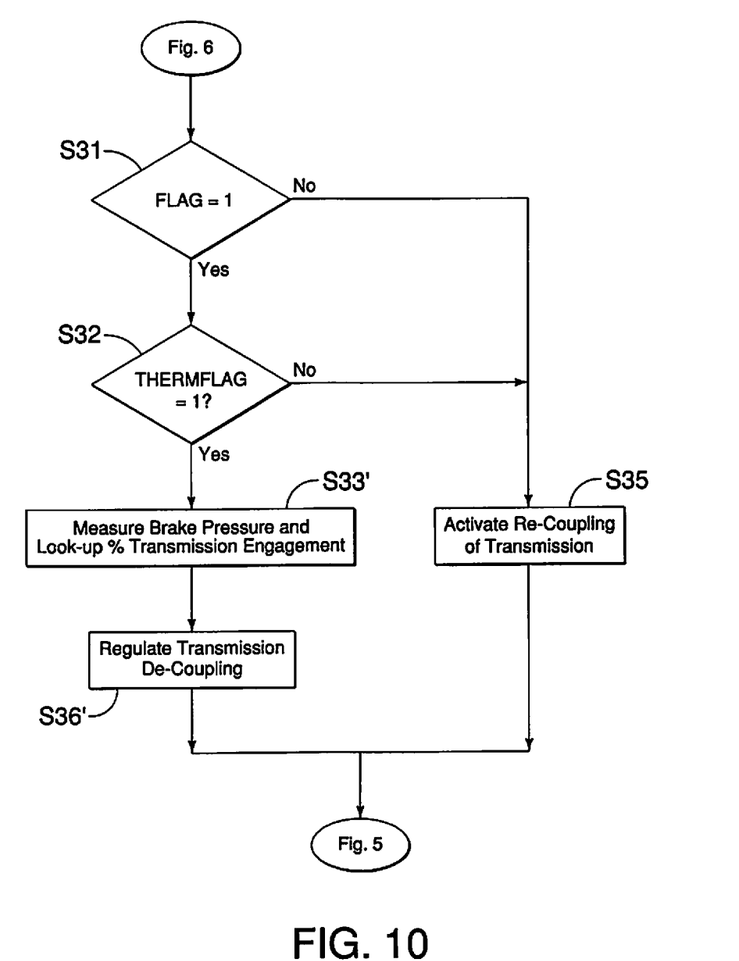
FIG. 10 is a flowchart showing various operations performed by the controller of the automatic transmission control management system in accordance with a second embodiment.
Figure 11:
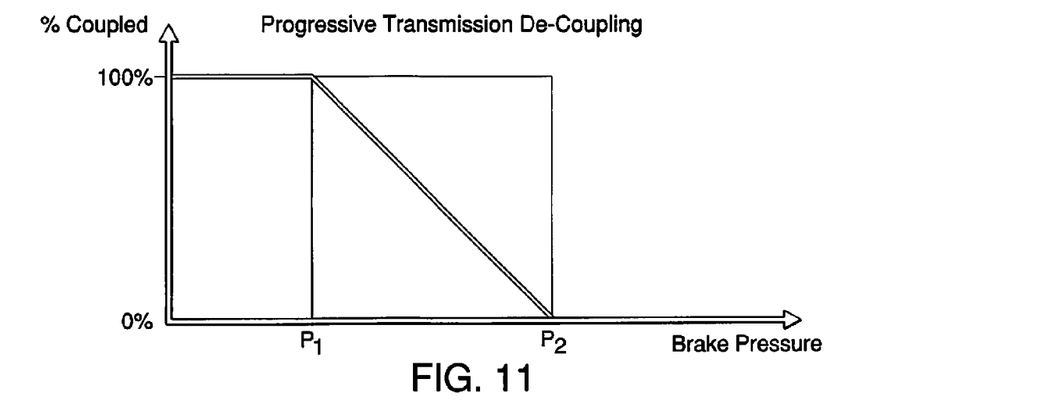
FIG. 11 is a chart that graphically represents the logic set forth in FIG. 10, showing a level of coupling/de-coupling of the transmission to/from the propulsion device as a function of detected brake pressure in accordance with the second embodiment.

In FIG. 10, steps S31, S32, S35 and S36 are identical to the steps S31, S32, S35 and S36 described above with respect to FIG. 7. However, in the flowchart depicted in FIG. 10, steps S33 and S34 of FIG. 7 have been replaced with modified step S33'. In step S33', the brake pressure measured by the brake sensor 62 is evaluated by the controller 20. In step S36', the controller 20 determines the level of coupling or de-coupling of the transmission 14 to the propulsion device 12 in a linear manner, as indicated in FIG. 11. Specifically, FIG. 11 is a graph showing measured brake pressure on the X-axis and the level of coupling of the transmission 14 to the propulsion device 12.

In FIG. 11, with the brake pressure at zero (0), the transmission 14 is 100 percent coupled to the propulsion device 12. At a first predetermined pressure $P_1$, the controller 20 instructs the hydraulically powered shift control section 26 to begin decoupling the transmission 14 from the propulsion device 12. Further increases in brake fluid pressure cause a linearly corresponding decrease in the level of coupling the transmission 14 from the propulsion device 12. Once the brake fluid pressure reaches a level corresponding to $P_2$, the transmission 14 is completely decoupled from the propulsion device 12.

Figure 12:
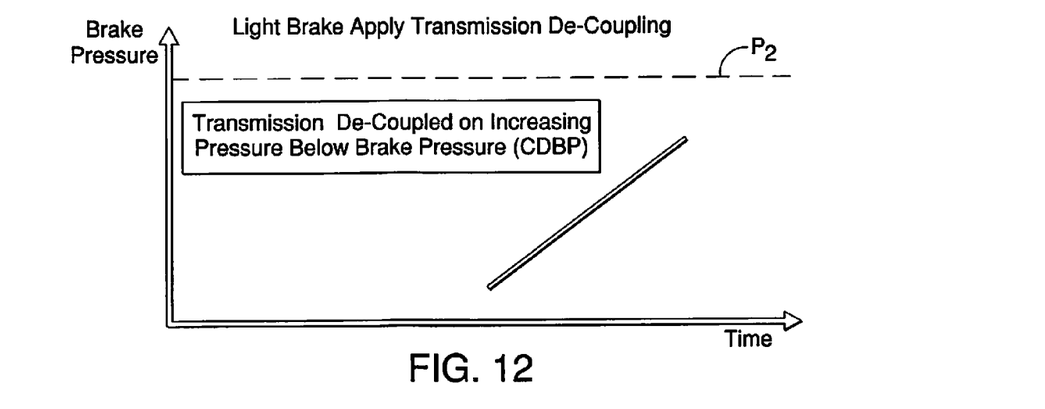
FIG. 12 is a chart that graphically represents a level of de-coupling of the transmission from the propulsion device as a function of detected brake pressure over time in accordance with the second embodiment.
Figure 13:
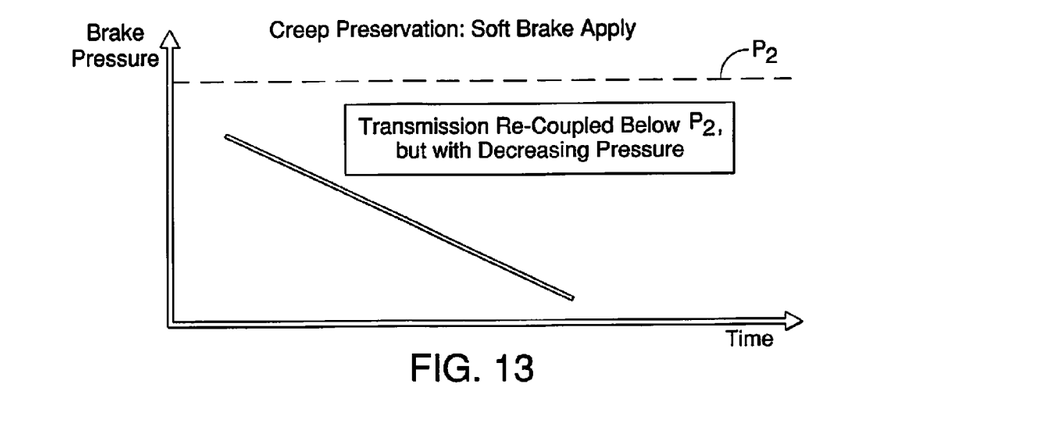
FIG. 13 is another chart that graphically represents a level of re-coupling of the transmission to the propulsion device as a function of detected brake pressure over time in accordance with the second embodiment.

FIGS. 12 and 13 show examples of modifications to the logic set forth in FIG. 10. Specifically, as shown in FIG. 12, if the brakes are applied, after a predetermined period of time, as the brake pressure is detected to gradually increase, the controller 20 can gradually decouple the transmission 14 from the propulsion device 12, as indicated by the sloped line in FIG. 12.

As shown in FIG. 13, the logic set forth in FIG. 10 can be modified with respect to re-coupling of the transmission 14 to the propulsion device 12 after the transmission 14 has been completely decoupled from the propulsion device 12. For example, as shown in FIG. 12, after a predetermined period of time, as the brake pressure is gradually decreased, the controller 20 can gradually recouple the transmission 14 to the propulsion device 12.

Third Embodiment

Figure 14:
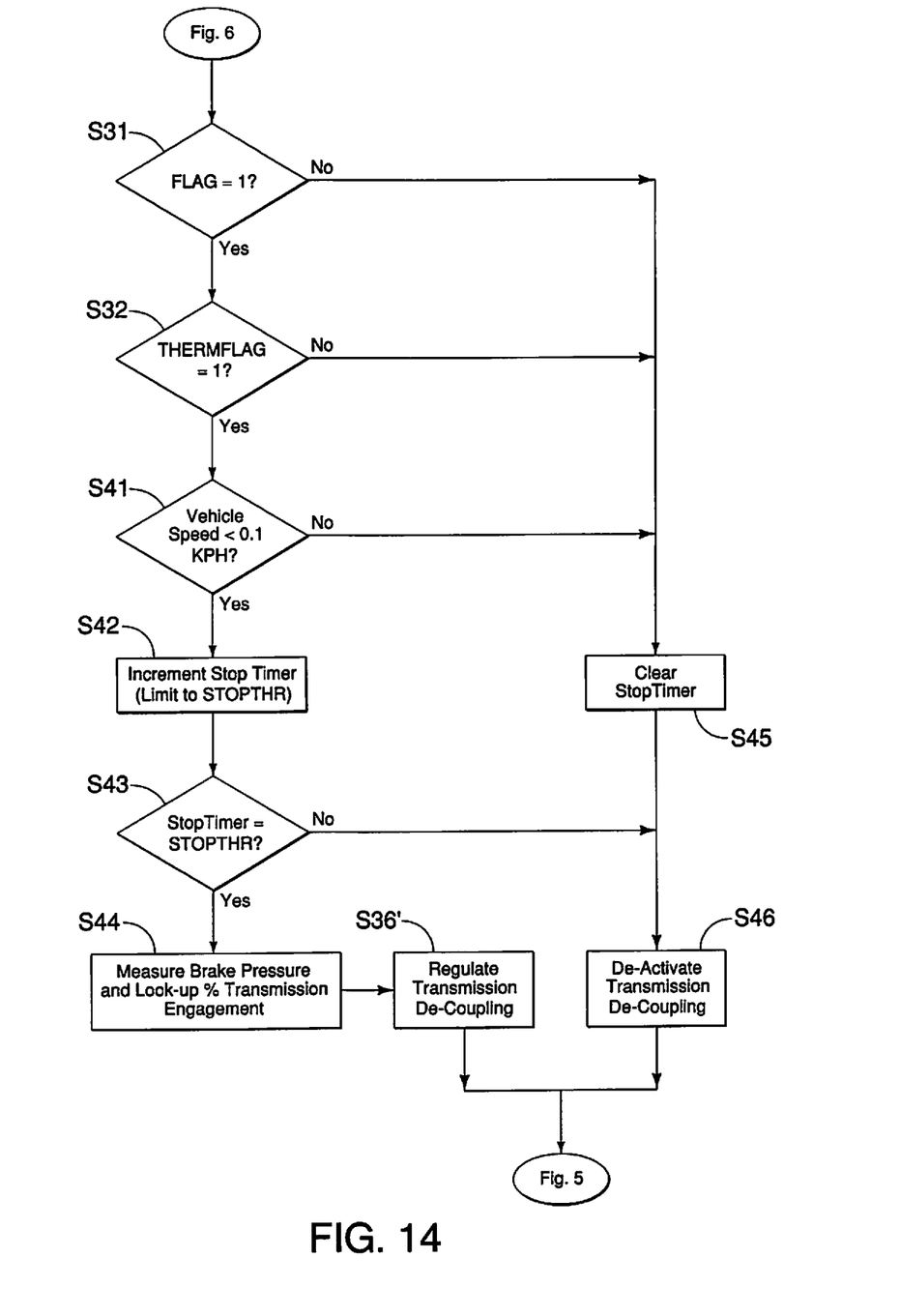
FIG. 14 is a flowchart showing various operations performed by the controller of the automatic transmission control management system in accordance with a third embodiment.

Referring now to FIG. 14, logic of the controller 20 is shown in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the logic described above with respect to FIGS. 5 and 6 remains unchanged. However, in the third embodiment, the logic in the flowchart of FIG. 7 is replaced by the logic set forth in the flowchart of FIG. 14.

In FIG. 14, several variables are defined. For example, a variable STOPTHR is defined as a time period, such as thirty (30) seconds but varies depending upon the vehicle. Another variable StopTimer initially defined as being equal to zero, but is continuously incremented upward by the controller 20 during the logic steps in FIG. 14.

In FIG. 14, the step S31 is basically the same as described above with respect to FIG. 7. Specifically, at step S31, if FLAG is not equal to one (1), then operation moves to step S45. If FLAG is equal to one (1) then operation moves to step S32.

At step S32, the controller 20 determines whether or not the variable THERMFLAG is equal to one (1). If the variable THERMFLAG is equal to one (1), then operation moves to step S41. If the variable THERMFLAG is not equal to one (1), then operation moves to step S45.

At step S41, the controller 20 determines whether or not the vehicle speed is less than 0.1 KPH. If the vehicle speed is less than 0.1 KPH, then operation moves to step S42. If the vehicle speed is not less than 0.1 KPH, then operation moves to step S45.

At step S42, the controller 20 utilizes a variable Stop-Timer as a counter and increments the variable StopTimer up one digit. The controller 20 is programmed with a predetermined timing threshold STOPTHR that defines a maximum value for the counter variable StopTimer.

At step S43, the controller 20 determines whether or not the variable StopTimer is equal to the predetermined variable STOPTHR. If the variable StopTimer is not equal to the predetermined variable STOPTHR, then operation moves to step S46. If the variable StopTimer is equal to the predetermined variable STOPTHR, then operation moves to step S44.

At step S44 (like step S33' in FIG. 10), the brake pressure measured by the brake sensor 62 is evaluated by the controller 20. The controller 20 determines a level of coupling or de-coupling of the transmission 14 to the propulsion device 12 in a linear manner (as indicated in FIG. 11). As discussed above with respect to the second embodiment, FIG. 11 is a graph showing measured brake pressure on the X-axis and the level of coupling of the transmission 14 to the propulsion device 12.

After step S44, operation then moves to step S36'. At step S36', the controller 20 begins to decouple the transmission 14 from the propulsion device 12, in a manner similar to that described above with respect to steps S36' in FIG. 10, and as graphically depicted in FIG. 11. Operation then returns to FIG. 5.

At step S45, the controller 20 clears the value of the counter variable StopTimer, returning it to a value of zero.

In step S46, the controller 20 makes the decision not to decouple the transmission 14 from the propulsion device 12. If the transmission 14 is currently decoupled from the propulsion device 12, then at step S49, the controller 20 gradually recouples the transmission 14 to the propulsion device 12, as described above with respect to step S35 in FIG. 10, and shown graphically in FIGS. 12 and 13.

The controller 20 preferably includes a microcomputer with a transmission control program that controls the transmission 14, as discussed below. The controller 20 can also include other conventional components such as an input interface circuit, an output interface circuit, and storage devices such as a ROM (Read Only Memory) device and a RAM (Random Access Memory) device. The microcomputer of the controller 20 is programmed to control the hydraulically powered shift control section 26 of the transmission 14. The memory circuit stores processing results and control programs such as ones for transmission coupling and decoupling operations that are run by the processor circuit. The controller 20 is operatively coupled to the transmission 14 and the hydraulically powered shift control section 26 in a conventional manner. The internal RAM of the controller 20 stores statuses of operational flags and various control data. The controller 20 is capable of selectively controlling any of the components of the control system of the transmission 14 in accordance with the control program. It will be apparent to those skilled in the art from this disclosure that the precise structure and algorithms for the controller 20 can be any combination of hardware and software that will carry out the functions of the present invention.

The various elements of the vehicle 10 are conventional components that are well known in the art. Since the vehicle components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the automatic transmission control arrangement. Accordingly, these terms, as utilized to describe the present invention should be interpreted relative to a vehicle equipped with the automatic transmission control arrangement.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claim is:

1. An automatic transmission control arrangement comprising:
    a propulsion device providing power to a vehicle and having a cooling system;
    an automatic transmission coupled to the propulsion device to receive power therefrom and having a hydraulically powered shift control section;
    a selector device operably connected to the automatic transmission for selecting a mode of operation of the automatic transmission including at least a forward drive setting in which the automatic transmission is coupled to the propulsion device such that power is transmitted from the propulsion device through the automatic transmission and a neutral setting where the automatic transmission is decoupled from the propulsion device such that power cannot be transmitted from the propulsion device through the automatic transmission;
    a temperature sensor arrangement that measures a control temperature of at least one of the cooling system and the automatic transmission;
    a motion sensor arrangement that detects a motion status of the vehicle; and
    a controller operably coupled to the motion sensor arrangement, the temperature sensor arrangement and the automatic transmission, the controller being configured to temporarily operate the automatic transmission in a decoupled mode in which the automatic transmission is decoupled from the propulsion device with the selector device in the forward drive setting such that power cannot be transmitted from the propulsion device through the automatic transmission in order to reduce heat generation in response to the temperature sensor arrangement detecting the control temperature is greater than a predetermined temperature and the motion sensor indicating that the vehicle is not in motion.

2. The automatic transmission control arrangement according to claim 1, wherein
    the temperature sensor arrangement detects a hydraulic fluid temperature of the automatic transmission as the control temperature.

3. The automatic transmission control arrangement according to claim 1, wherein
    the temperature sensor arrangement detects a coolant temperature of the cooling system as the control temperature.

4. The automatic transmission control arrangement according to claim 1, wherein
    the temperature sensor arrangement comprises a first temperature sensor that detects a coolant temperature of the cooling system, and a second temperature sensor that detects the hydraulic fluid temperature of the automatic transmission, the control temperature comprising the coolant temperature and the hydraulic fluid temperature; and
    the controller further temporarily operates the automatic transmission in the decoupled mode in response to at least one of the coolant temperature being greater than a first predetermined temperature, and the hydraulic fluid temperature being greater than a second predetermined temperature.

5. The automatic transmission control arrangement according to claim 1, wherein
the motion sensor arrangement detects speed of the vehicle, and
the controller further temporarily operates the automatic transmission in the decoupled mode in response to the motion sensor arrangement detecting the speed of the vehicle is zero.

6. The automatic transmission control arrangement according to claim 1, wherein
the motion sensor arrangement comprises a pressure sensor that detects a hydraulic brake fluid pressure, and
the controller further temporarily operates the automatic transmission in the decoupled mode in response to the pressure sensor detecting the hydraulic brake fluid pressure being greater than a predetermined pressure.

7. The automatic transmission control arrangement according to claim 1, wherein the motion sensor arrangement comprises a speed sensor that detects a speed of the vehicle, and a pressure sensor that detects a hydraulic brake fluid pressure; and the controller further temporarily operates the automatic transmission in the decoupled mode in response to the pressure sensor detecting the hydraulic brake fluid pressure being greater than the predetermined pressure and the speed sensor detecting the speed of the vehicle is zero.

8. The automatic transmission control arrangement according to claim 1, wherein
the controller further detects existence of a disable condition and refrains from operating the automatic transmission in the decoupled mode in response to detecting the disable condition.

9. The automatic transmission control arrangement according to claim 8, further comprising
a four wheel drive assembly mechanically connected to an output shaft of the automatic transmission that includes a two wheel drive mode of operation and a four wheel drive mode of operation, and
the controller detecting the disable condition in response to the four wheel drive assembly being operated in the four wheel drive mode of operation.

10. The automatic transmission control arrangement according to claim 8, further comprising
a vehicle pitch detecting sensor connected to the controller that detects whether the vehicle is in an uphill inclined orientation, a level orientation and a downhill inclined orientation;
wherein the controller detects the disable condition exists in response to the vehicle pitch detecting sensor detecting the vehicle is in the uphill inclined orientation.

11. The automatic transmission control arrangement according to claim 8, further comprising
an RPM sensor connected to the propulsion device and the controller;
wherein the controller detects the disable condition exists in response to the RPM sensor detecting that the propulsion device is operating above a predetermined RPM speed.

12. The automatic transmission control arrangement according to claim 8, further comprising
a throttle position sensor connected to the propulsion device and the controller;
wherein the controller detects the disable condition exists in response to the throttle position sensor detecting a propulsion device throttle is in an acceleration position.

13. The automatic transmission control arrangement according to claim 8, further comprising
a towing switch connected to the automatic transmission and the controller, the towing switch being operable to switch the automatic transmission between a towing mode of operation and a non-towing mode of operation;
wherein the controller detects the disable condition exists in response to the towing switch being set to operate the automatic transmission in the towing mode of operation.

14. The automatic transmission control arrangement according to claim 8, further comprising
an air conditioning system; and
a pressure sensor connected to the air condition system and the controller that detects refrigerant pressure of the air conditioning system;
wherein the controller detects the disable condition exists in response to the pressure sensor detecting that the refrigerant pressure is within a predetermined range of pressures.

15. The automatic transmission control arrangement according to claim 8, further comprising
a vehicle dynamic control system connected to the controller, a braking system, a steering system, and the propulsion device of the vehicle;
a manually operated switching device operably connected to the vehicle dynamic control system and the controller that switches the vehicle dynamic control system between an enabled mode of operation and a disabled mode of operation, and
the controller detects the disable condition exists in response to the vehicle dynamic control system being set to the disabled mode of operation.

* * * * *